UNITED STATES PATENT OFFICE.

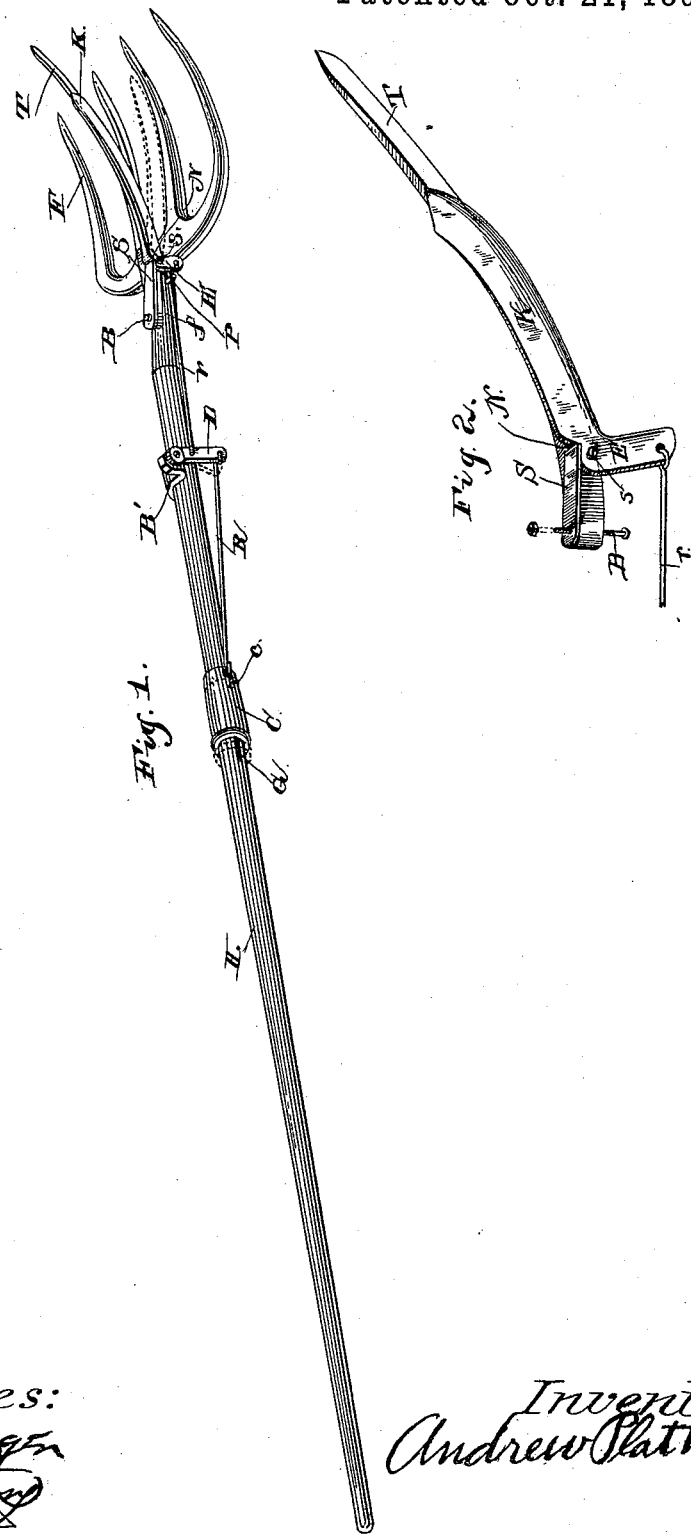

ANDREW PLATTNER, OF HASTINGS, NEBRASKA.

BAND-CUTTING FORK.

SPECIFICATION forming part of Letters Patent No. 438,765, dated October 21, 1890.

Application filed October 26, 1889. Serial No. 328,349. (No model.)

*To all whom it may concern:*

Be it known that I, ANDREW PLATTNER, a citizen of the United States, residing at Hastings, in the county of Adams and State of Nebraska, have invented a new and useful Automatic Self-Band-Cutting Fork, of which the following is a specification.

This invention relates to thrashing, and more especially to the band cutters and feeders thereof; and the object of the same is to provide an improved band-cutting fork.

To this end the invention consists of the specific details of construction and relative arrangement of parts hereinafter particularly pointed out, and illustrated in the accompanying drawings, wherein—

Figure 1 is a perspective view of this fork, and Fig. 2 is an enlarged perspective detail of the tine and knife.

The letter H designates the handle, and F the fork proper, of an ordinary pitchfork, to which my attachment is applied, and as all the parts of said attachment are detachably connected with said fork the attachment may be made and sold as an article of manufacture. Said attachment comprises a tine T, secured to the shank $f$ of the fork by a single screw or bolt B, which tine extends upwardly from its point of attachment, and also curves slightly upwardly, and whose outer end stands about above the outer ends of the tines of the fork F, as shown.

K is a knife having a sharpened lower edge and provided with a downwardly-extending elbow E at its inner end, and a screw $s$ passes through the same at the angle between them and into the side of the tine T.

S is a flat spring secured upon the tine T at its inner end, with its free end bearing downwardly in a notch N, cut in the corner between the knife K and the elbow E. The action of this spring is to hold the knife alongside the tine T, so that its sharp edge will be protected thereby and no injury will come to the grain or to the operator. When in this position, the front edge of the elbow E rests against the head or upper end of the fork F. When in its opposite position, as shown in dotted lines, the elbow E abuts against a pin P, seated in the side of the shank $f$.

C is a collar surrounding and sliding loosely upon the handle H, and $c$ is a pin therein, which moves in a groove G, formed in said handle, and limits the movement of the collar.

L is a lever pivoted at its upper end to a bracket B', which is detachably connected to the upper side of the handle H, as shown, and the free end of this lever is connected by a rod R with the moving collar C. A second rod $r$ connects the lower end of the elbow E with the lever L near the pivot of the latter. By this construction when the collar C is drawn upwardly on the handle the lever is moved to the rear, and the elbow E is also so moved, throwing the knife K downwardly toward the fork F. Upon releasing the collar C the spring S elevates the knife.

In handling bundles of grain it is desirable to pick them up so they may be thrown endwise, as thus less surface is presented to the opposition of the air and less labor is required, and they can be thrown with more certainty; also, when the bundle is to be delivered onto the feed-table of a thrashing-machine it can be spread better when it is held by the fork in the direction of its length. It is to enable this handling of the bundle that I have arranged my knife to cut at right angles to the plane in which the tines lie.

In operation the fork is inserted into the bundle in the direction of its length and in such a manner that the fork F will be beneath and the tine T above the band which holds the bundle. The latter is then lifted by the fork and placed or thrown to the desired position, the band being cut after the bundle has been so placed or even with a little practice in the act of throwing the bundle. The spring S normally holds the knife in position alongside the tine T, so that the device will not injure the grain or the operator. The advantage of using the lever L is that greater power is given the cutting action of the knife. When it is desired to use the fork for other purposes, the bolt B is removed and the bracket K and collar C are taken from the handle, whereby the entire attachment will be detached, leaving a fork of ordinary construction.

What I claim is—

1. As a new article of manufacture, the herein-described pitchfork attachment, the same comprising an upwardly-curved rigid tine T and a knife K, approximately the shape of the said tine and lying normally alongside the same, substantially as set forth.

2. As a new article of manufacture, the herein-described pitchfork attachment, the same comprising an upwardly-curved tine T, a knife K, approximately the shape of said tine and lying normally alongside the same, an elbow E, depending from the inner end thereof, a flat spring S, secured at its rear end to said tine and bearing at its free end against the elbow, a lever L, pivoted to the bracket B′, a collar C, connected by a rod R at the free end of said lever, and a rod r, connecting said lever with the free end of said elbow, as set forth.

3. As a new article of manufacture, the herein-described pitchfork attachment, the same comprising an upwardly-curved tine T, a knife K, approximately the shape of the said tine, with an elbow E depending from its inner end and a notch in the angle, and a spring S, secured at its rear end to said tine and bearing at its free end in said notch, substantially as set forth.

ANDREW PLATTNER.

Attest:
JOHN F. BALLINGER,
H. H. CHERRY.